United States Patent [19]

Lacher

[11] Patent Number: 4,490,821
[45] Date of Patent: Dec. 25, 1984

[54] CENTRALIZED CLOCK TIME ERROR CORRECTION SYSTEM

[75] Inventor: William A. Lacher, Lansdale, Pa.

[73] Assignee: Burroughs Corporation, Detroit, Mich.

[21] Appl. No.: 448,964

[22] Filed: Dec. 13, 1982

[51] Int. Cl.³ ............................................. G06F 11/00
[52] U.S. Cl. .......................................... 371/1; 364/900
[58] Field of Search ...................... 371/69, 1; 364/200, 364/900

[56] References Cited

U.S. PATENT DOCUMENTS

| | | | |
|---|---|---|---|
| 3,325,794 | 6/1967 | Jenkins | 371/1 |
| 3,456,237 | 7/1969 | Collins | 371/1 |
| 3,530,663 | 5/1969 | Marti | 371/61 |
| 3,927,392 | 12/1975 | Caron | 371/1 |
| 4,115,759 | 9/1978 | Besenfelder | 371/1 |
| 4,139,147 | 2/1979 | Franke | 371/1 |
| 4,218,771 | 8/1980 | Hogge | 371/61 |
| 4,330,846 | 5/1982 | Colles | 364/900 |

FOREIGN PATENT DOCUMENTS 0074246 6/1977 Japan ........................................ 371/1

OTHER PUBLICATIONS

Mandra, R. R., "Skew Corrector", IBM Tech. Dis. Bulletin, vol. 12, No. 4, Sep. 1969, p. 593.

Primary Examiner—Jerry Smith
Assistant Examiner—Michael R. Fleming
Attorney, Agent, or Firm—Francis A. Varallo; Mervyn L. Young; Kevin R. Peterson

[57] ABSTRACT

The present disclosure describes a system for substantially eliminating clock signal timing errors occurring between the signal paths of the various cabinets or modules of a large, high speed digital synchronous data processor. Such errors result from the most part because of the long cable lengths needed for coupling the cabinets to a master clock source. The present system provides a measure of the signal delay from the output of the master clock source through the elements of a given cabinet and permits corrective measures to be made at a single location within the cabinet without the necessity of accessing the large number of elements contained therein.

14 Claims, 3 Drawing Figures

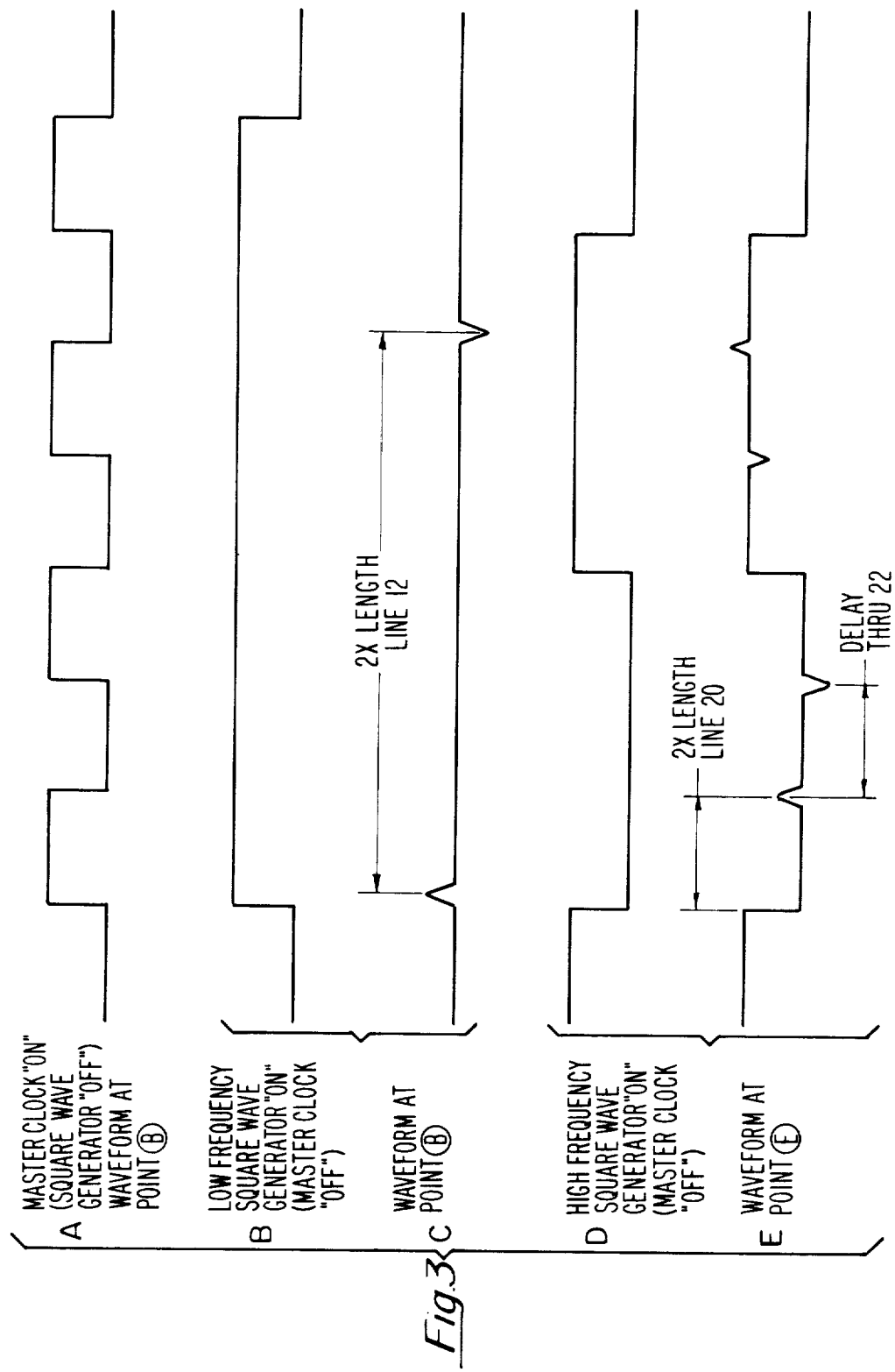

CENTRALIZED CLOCK TIME ERROR CORRECTION SYSTEM

BACKGROUND OF THE INVENTION

Large digital computer systems with massive control and storage capability require a plurality of cabinets or modules dedicated to functions such as central processing, memory and input/output. In a typical configuration, the cabinets are separated from one another physically and require long cables to provide signal paths from one cabinet to another and also from a source of master clock pulses to each of the cabinets. The length of the cables required for the latter is a function of the physical floor space covered by the system, which in turn, is dictated by design requirements for interconnection, maintenance, and system configurations.

Each of the aforementioned cabinets includes a multiplicity of clocked elements situated on logic cards and activated in synchronism with the elements of the other cards by the signal pulses applied thereto from the master clock. The timing of these signal pulses is very critical and ideally there should be no time difference from one cabinet to the other. More practically, the time difference or clock skew between the clock signal paths from the output of the master clock source to the inputs to the logic cards in the respective cabinets must be limited to less than two or three nanoseconds.

Since these larger computer systems operate at high data rates, for example of the order of 10 mHZ, the long cables for example, 40 feet or more, create severe timing problems. For example, while the nominal delay per foot of twisted pair shielded cable is known, the manufacturing delay tolerance alone may result in an intolerable degree of clock skew between the common master clock source and the respective inputs to the various cabinets. Moreover, significant time delays occur between the respective inputs to the cabinets and the clocked elements contained therein, and these delays are not the same from cabinet to cabinet.

What is needed is a means for conveniently removing the master clock timing errors in a given cabinet. The present system fills such a need.

SUMMARY OF THE INVENTION

In accordance with the present invention, there is provided a system for measuring the clock signal delay from the output of the master clock source to the inputs of the clocked elements situated in a given cabinet. Such measurements are conveniently performed, and corrective measures made, at a single centralized location within the cabinet.

The computer organization contemplated by the present disclosure is one in which a Master Clock is coupled by long twisted pair shielded transmission lines to a cabinet or module which includes a Clock Cabinet Buffer. The latter shapes and encodes the master clock pulses and provides the necessary fan-out via shorter coaxial lines to drive all the logic cards in the cabinet which require a clock. If a transmission line is terminated in its inherent characteristic impedance, it will faithfully transfer the input pulse to its output with only an attenuation and frequency loss proportioned to the line length. On the other hand, if the line is terminated with a higher or lower impedance, then a reflected signal will be sent back to the sending end.

In the present invention, a discontinuity is deliberately introduced into the clock signal path, thereby creating a reflected pulse which may be interpreted by the use of an oscilloscope to show the exact length of each line, in time, without moving to those distant points to measure the time difference. The centralized location chosen for delay measurement and corrective action is the Clock Cabinet Buffer.

A suitable dual-frequency square wave generator is provided on the Clock Cabinet Buffer card to implement the present invention. The Master Clock and the logic cards are in turn, modified respectively to respond to the square wave pulses directed thereto. As a result, reflected pulses as seen on an oscilloscope attached to predetermined test points on the Clock Cabinet Buffer card provide actual delay time measurements of the long transmission line between the output of the Master Clock and the input to the Clock Cabinet Buffer, and of the short line and the Card Clock Buffer situated between the output of the Clock Card Buffer and the input to the clocked elements on a logic card. The worst case delay times are known from calculations and previous measurements of the individual elements in the clock signal paths and hence a figure for the total worst case delay is established.

A plurality of independent, adjustable delay means are coupled respectively to the short transmission lines driven by the Clock Cabinet Buffer and are located on the card of the latter. The desired worst case delay from a point at the input to one of said plurality of delay means and the input to the clocked elements on a logic card may be precalculated. Having measured the actual delay contributed by a short coaxial line and the Card Clock Driver in a given path, the last mentioned delay means may be adjusted in accordance with the actual delay between the input to the delay line and the output of the Clock Cabinet Buffer to achieve the precalculated worst case figure for this partial signal path.

The Clock Cabinet Buffer card also includes a single adjustable delay device coupled between the input to the last mentioned card and the common inputs to all of said plurality of delay means. Since the total worst case maximum delay for the entire clock signal path has been preestablished, the last mentioned worst case delay figure for the partial path is added to the measured delay in the twisted pair line to form a subtotal. The delay device is then adjusted in accordance with the actual measured delay from the Clock Cabinet Buffer input to the inputs of said plurality of delay means to provide the balance of the delay to achieve said total maximum delay for the entire path.

Thus, the delay from the output of the Master Clock to the output of each Card Clock Driver in a cabinet may be set to the same total worst case delay figure. Moreover, all the Clock Cabinet Buffers in the respective plurality of cabinets which make up the computer system would be set to the same worst case maximum delay figure. This achieves uniform delay throughout the system, insuring that the clocked elements driven from the common Master Clock will all be activated at precisely the same time.

It is a significant feature of the present invention that all of the corrective action take place on a single card for each cabinet, the former being conveniently placed on a card extender, and does not require for example, the accessing of the multiplicity of logic cards associated with each cabinet. Formerly, timing differences in large systems were either tolerated, thereby reducing the system efficiency, or various logic cards had to be placed on extenders and long oscilloscope cables were used to allow the observance of these timing differences, which were then removed by the use of tapped delay lines.

BRIEF DESCRIPTION OF THE DRAWINGS

FIG. 3 depicts various waveforms occurring in the schematic of FIG. 2.

DESCRIPTION OF THE PREFERRED EMBODIMENT

Figure 1:
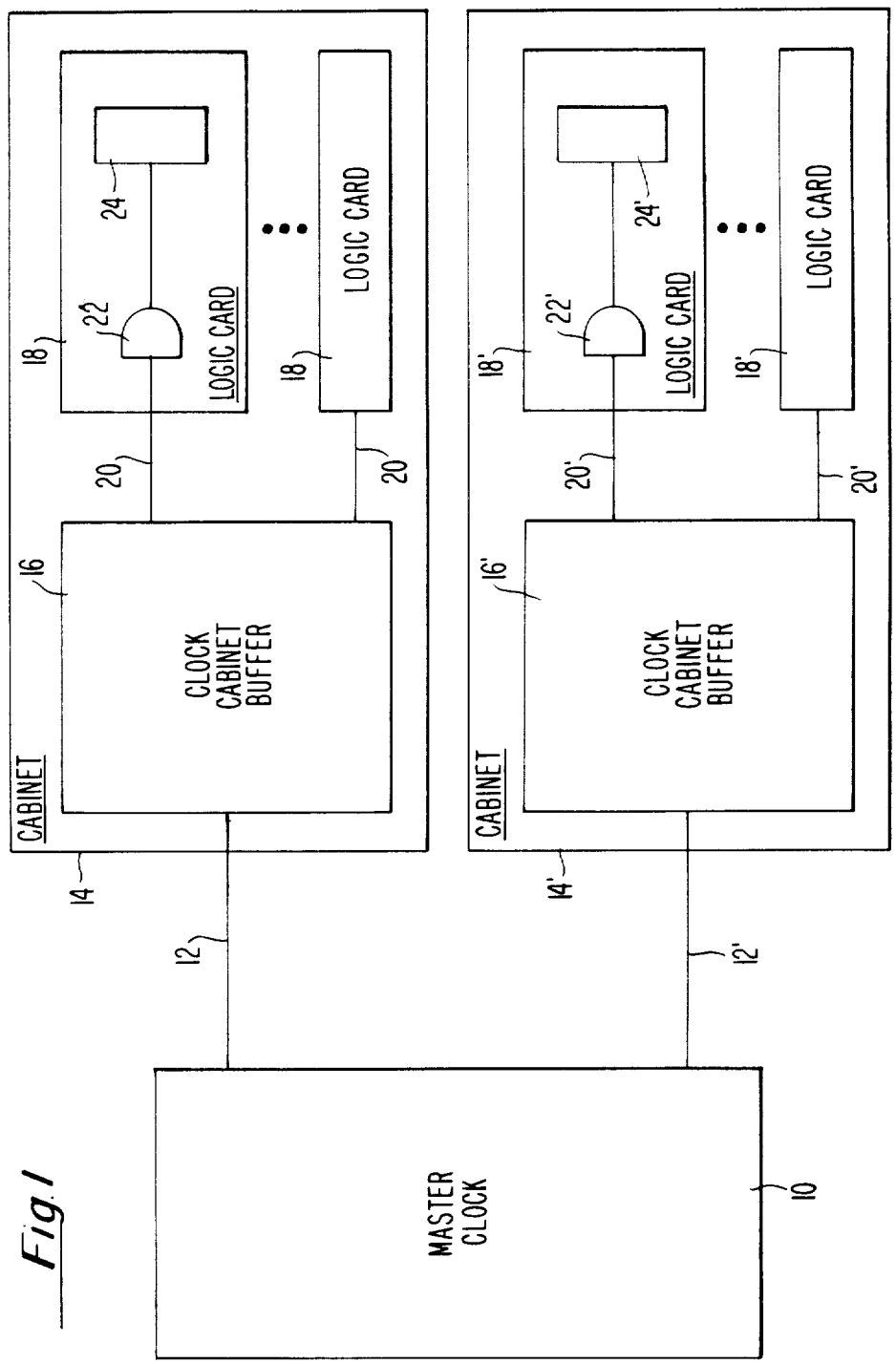
FIG. 1 depicts in highly simplified form, a typical clock signal path for a large scale data processor.

FIG. 1 illustrates in simplified form the typical clock signal path in a large scale computer system. The clock signals which are the master control pulses in a digital synchronous computer system are generated within the Master Clock 10. In general the latter is comprised of an extremely accurate crystal controlled oscillator that is buffered to drive a plurality of long shielded twisted-pair transmission lines, two of which 12 and 12' are illustrated. To avoid any time differences at the outputs of the Master Clock, separate tapped delay lines are included in the Master Clock 10 and act respectively upon the plurality of output lines. Assuming a nominal mid-tap position for a given one of the lines, which then serve as a reference, all the delay line means for the remaining output lines are adjusted by means of an oscilloscope to conform with the reference time delay. In this manner, no time difference is present at the Master Clock 10 outputs.

The signals from the Master Clock 10 are transmitted via lines 12 and 12' to respective cabinets 14 and 14' dedicated to particular functions in the computer system. For example, cabinet 14 may house the central processor, while cabinet 14' contains the memory. While only two cabinets are illustrated in FIG. 1, it should be understood that an actual operative system will include other cabinets, such as one for the input/output elements.

In a typical large computer system, each of the shielded twisted-pair lines 12 and 12' may be 40 feet in length. If is assumed that the lines have a nominal time delay per foot of 1.3 nanoseconds and a manufacturing tolerance of ±5%, it is possible for the two 40 foot lines with a maximum tolerance spread to create a time delay difference of over 5 nanoseconds. This timing difference cannot be tolerated, and it, and other timing errors, are corrected by the present system.

Each of the cabinets 14 and 14' includes a Clock Cabinet Buffer 16 and 16' for shaping and encoding the clock pulses received from the Master Clock. The Clock Cabinet Buffer 16 for example, provides the necessary fan-out to drive all the logic cards 18 in the Cabinet 14 via respective short coaxial lines 20. Each logic card 18 or 18' further includes a Card Clock Buffer 22 and 22' and a clocked logic element 24, 24', which may be a storage element such as flip-flop or other type of memory device. While for example only two logic cards 18 are illustrated in Cabinet 14, it should be understood that a large number of such cards 18 are normally driven by a single Clock Cabinet Buffer 16.

Assuming as before that a shielded twisted-pair cable 12 from the Master Clock 10 to the Clock Cabinet Buffer 16 is 40 feet in length, and that a coaxial line 20 is approximately 4 feet in length, and considering the delays in the Clock Cabinet Buffer 14 and Card Clock Buffer 22, the total delay from the output of the Master Clock 10 to the output of the Card Clock Buffer 22 is of the order of 100 nanoseconds. Moreover, the timing difference or skew between the two clock signal paths for Cabinets 14 and 14' illustrated in FIG. 1 may be approximately 19 nanoseconds.

Figure 2:
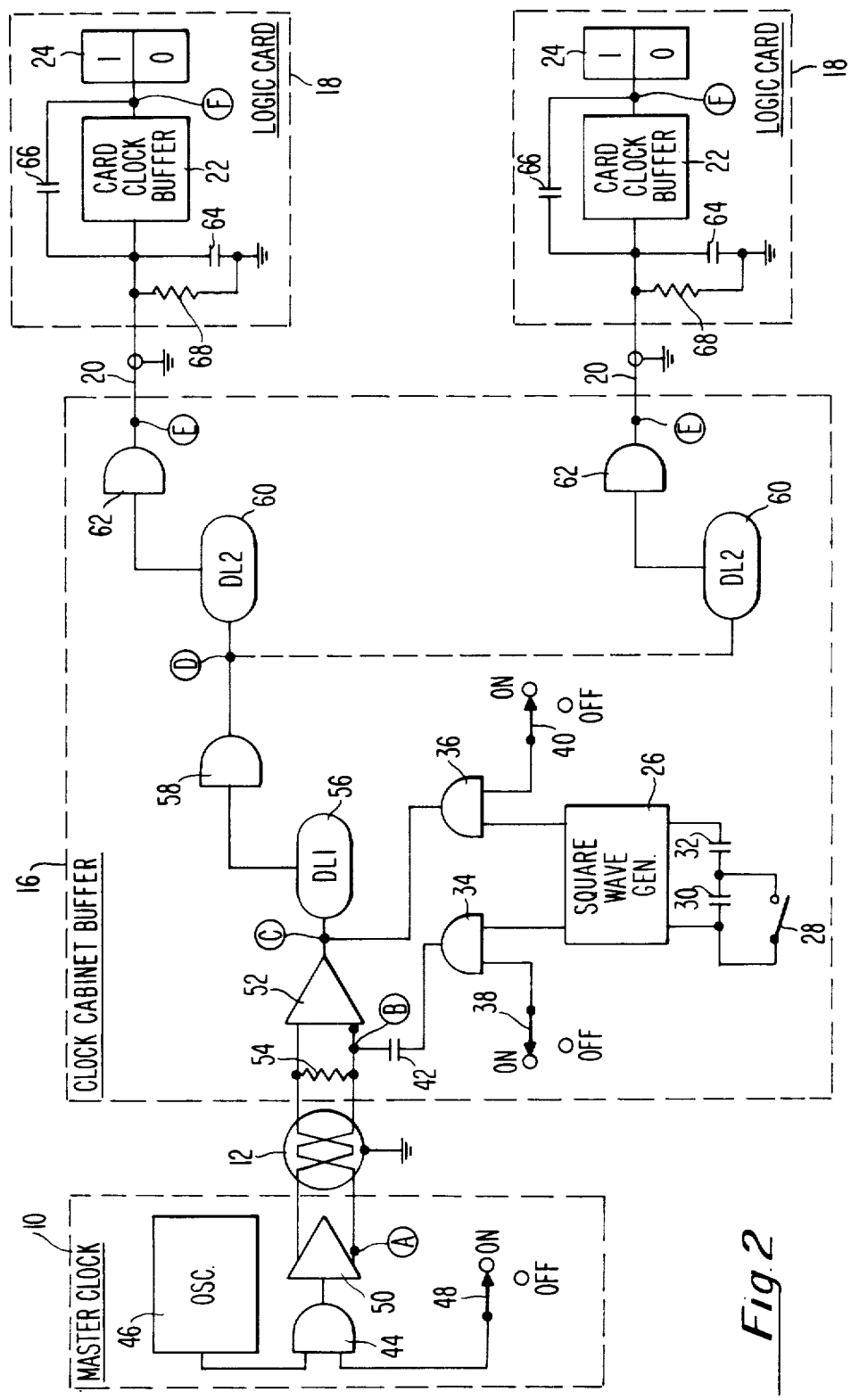
FIG. 2 illustrates in schematic form the centralized clock timing error correction system of the present invention.

The measurement and correction of time delay differences in all of the clock signal paths in the computer system are accomplished in accordance with the circuit organization of FIG. 2, which should be considered in conjunction with the waveforms of FIG. 3. All of the measurements and delay adjustments are performed on the centrally disposed card containing the Clock Cabinet Buffer 16 which may be conveniently accessed by placing it on a card extender. As noted hereinbefore, it is the purpose of the corrective system taught herein to introduce discontinuities in the clock signal paths which result in the generation of reflected pulses. The latter may be interpreted by the use of an oscilloscope to show the exact length of the transmission lines in time without having to physically access distant points to measure time differences.

A Square Wave Generator 26 is introduced onto the card of the Clock Cabinet Buffer 16. The generator 26 is capable of selectively providing square wave pulses of difference frequencies respectively to points B and C. The duration of the square wave is selected to be longer than twice the length of the line to be measured, in nanoseconds. The two distinct square waves produced by generator 26 are selected by the actuation of switch 28. Capacitors 30 and 32 associated with generator 26 are frequency determining, such that when switch 28 is open, the frequency of the square wave pulses is high, and low, when capacitor 30 is shorted by the switch closure. In either case, the frequency is selected so that a good oscilloscope reading may be made for the round trip time needed during low frequency testing of the long shielded twisted-pair line 12, and the high frequency testing of the comparatively short coaxial lines 20. AND gates 34 and 36 are assumed to be enabled respectively in response to the placement of switches 38 and 40 in the ON position. With switch 28 closed (shorting capacitor 30), and switches 38 and 40 in the ON and OFF positions respectively, the lower frequency square wave pulses are coupled via capacitor 42 into point B of one of the pair of long twisted wires 12. Alternatively, with switch 28 open, switch 40 ON, switch 38 OFF, the higher frequency pulses are delivered to point D in the clock signal path.

In order to utilize the reflection technique of the present invention as it relates to the lines 12 between the Master Clock 10 and the Clock Cabinet Buffer 16, the former is adpated to be turned OFF during the delay measurement procedure. Thus, AND gate 44 receives inputs from the oscillator 46 in the Master Clock 10 on one of its terminals, and a signal via switch 48 on its other input terminal. When switch 48 is in the OFF position, no clock signals are transmitted over lines 12. Conversely, the normal clock signal path is established when switch 48 is in the ON position. The output of AND gate 44 is applied to the input terminal of a differential driver 50 leaving a pair of output terminals coupled to the respective pair of twisted lines 12. The differential driver 50 is designed such that when the Master Clock 10 is turned OFF, one of its output terminals at point A assumes a −0.8 volt DC level, while its other terminal assumes a −1.6 volt DC level. These DC levels are carried over the twisted-pair 12 to the respective dual input terminals of a differential receiver 52, located on the card containing the Clock Cabinet Buffer 16. It should be noted that a resistor 54 placed across the twisted-pair 12 at the differential receiver inputs, has a value which matches the twisted-pair line impedance. Thus, when the Master Clock 10 is sending normal clock pulses to the Clock Cabinet Buffer 16, these pulses will not be distorted by the line 12.

With continued reference to FIG. 2 and additional reference to the waveforms of FIG. 3, it may be assumed that initially the Master Clock 10 is ON, generating pulses as seen in waveform A of the latter figure. It is also assumed that at this time both AND gates 34 and 36 associated with Square Wave Generator 26 are disabled, so that the generator 26 is effectively OFF. If it is desired to measure the time required to transmit a pulse from the Master Clock 10 to the Clock Cabinet Buffer 16 (that is, from point A to point B in FIG. 2), the long twisted-pair, AND gate 44 is disabled, turning OFF the Master Clock 10. When this is accomplished, a DC level of −0.8 volts appears at points A and B. This level is characterized as a logic high level in an ECL type logic, utilized in the present system, but the logic type should not be considered limitative of the inventive techniques described herein. This logic high level is created by a combination of circuitry having an emitter follower stage as the output driver in the differential device 50. The appearance of the −0.8 volt level indicates that the emitter follower stage is ON. Looking back from point B in the Clock Cabinet Buffer 16 along one of the twisted-pair 12 to the active emitter follower stage in the Master Clock 10, a much lower than required terminating impedance is furnished for the twisted-pair 12.

In this way, a mismatch has been created at the normal sending end of the transmission line 12. If switch 28 of Square Wave Generator 26 is closed, and switch 38 is moved to the ON position, a low frequency square wave as in waveform B of FIG. 3 is applied via capacitor 42 to point B in FIG. 2. As seen in waveform C of FIG. 3, the leading edge of the square wave produces a narrow positive pulse which progresses down line 12 and encounters the mismatched termination provided by the active emitter follower output stage of differential driver 50. Since the termination appears as a semi-shorted line, it reflects an inverted pulse back to point B in the Clock Cabinet Buffer 16. The time between the pulses in waveform C of FIG. 3 is exactly twice the delay in the twisted-pair 12, and provides a precise measure of the delay in the clock signal path from point A to point B.

Having measured the delay in the long, that is, the 40 foot shielded twisted-pair 12, a similar measurement is needed for the short, approximately 4 foot coaxial lines 20 coupling the respective outputs of the Clock Cabinet Buffer 16 to the plurality of logic cards 18. Because the coaxial lines 20 are comparatively short, it is advantageous to use a higher frequency square wave that is similar to the actual repetition rates utilized in the computer system. To accomplish this, the Master Clock 10 remains OFF, and the switch 28 associated with the Square Wave Generator 26 is opened. Switch 38 is at the OFF position; switch 40, ON. In place of capacitively coupling the Square Wave Generator 26 output to the single twisted-pair at point B, the output of AND gate 36 is connected directly into the clock signal path at point C, thereby avoiding separate couplings to the large numbers, for example, one hundred, coaxial lines 20 to the logic cards 18. The high frequency square waves propagate through a first common adjustable delay line (DL1) 56, a gate buffer 58, a plurality of second adjustable delay ines (DL2) 60, and associated gate buffers 62, for driving the respective short lines 20.

It should be noted that when a signal is sent from the Clock Cabinet Buffer 16 through a short coaxial line 20, it is imperative that the line be terminated in its characteristic impedance to insure the retention of proper waveshape, that is, fast rise and fall times, of the order of one or two nanoseconds. At the same time, it is necessary to provide a discontinuity which will yield a reflected pulse indicative of delay in the coaxial line 20. Accordingly, two capacitors 64 and 66 have been introduced into each logic card to produce the needed reflections. When a high frequency square wave, as seen in waveform D of FIG. 6, travels down the short coaxial line 20, it encounters a momentary discontinuity created by capacitor 64. In addition, capacitor 66 produces a second discontinuity, displaced in time from the first. Resistor 68 terminates the line 20 in its characteristic impedance.

More specifically, with continued reference to waveform E of FIG. 3, which is taken at point E (FIG. 2), the negative going edge of the square wave pulse is transmitted down the short coaxial line 20, and some time later, a positive pulse is seen. This indicates that the aforementioned negative going edge has travelled to the end of the line, and encountered capacitor 64 which appears as a semi-short circuit for a brief period of time. The short circuit causes a phase reverse and therefore with a negative transition starting the series of events, a positive going pulse is reflected back which arrives at point E exactly twice the length of the short line 20 in nanoseconds. In addition to the positive pulse, a negative pulse may be seen at a later time at point E which is created by capacitor 66 and represents the negative edge of the signal output of the Card Clock Buffer 22. Therefore, the difference in time between the consecutive positive and negative pulses is a measure of the delay through the Card Clock Buffer 22 itself. It should be noted that the values of capacitors 64 and 66 are chosen to produce a visible blip on the monitoring oscilloscope at point E, but are designed to be substantially less in amplitude than the threshold level of the Card Clock Buffer 22.

Having measured the delay in the system from point A to point B (FIG. 2), and point E to point F, from a central location, the Clock Cabinet Buffer 16, the desired delay in the clock signal path is set as follows.

The worst case maximum delays for the lines 12 and 20, the various gates and the Card Clock Buffer 22 are precalculated and/or measured. Thus, a total worst case delay for the clock signal path from point A to point F in FIG. 2 is established. From the foregoing, the worst case maximum delay from point D to point F is predetermined and is the same for all of the multiplicity of fan-out clock signal paths to the logic cards 18. Therefore, for a given path, the delay line (DL2) 60 disposed therein, is adjusted in accordance with the actual measured delay between points D and E to provide a delay which when added to that previously measured at point E for the given path, (as taught by the present invention) yields the desired worst case maximum time from points D to F. In this manner all of the multiplicity of paths D to F for the many logic cards, situated in the same and different cabinets 14 will be set to the same time delay.

Finally, the delay measured from point A to point B (the delay in line 12) for a given clock signal path is added to the established worst case maximum from points D to F, to yield a subtotal time. The delay line (DL1) 56 is then adjusted concurrently with the measurement of the actual delay between points B and D in the Clock Cabinet Buffer 16 to provide a delay time between the last mentioned points which, when added to the aforementioned subtotal time, yields the total worst case maximum delay for the entire clock signal path. All Clock Cabinet Buffers 16 in the various Cabinets 14 of the computer system are set up in the same manner, so that all conform to the same worst case maximum delay time number.

In conclusion, there has been disclosed a system for time skew correction in multiple clock signal paths. By introducing discontinuities in the signal paths and coupling specially generated square waves of predetermined frequencies into the paths, it is feasible from a central location, namely, the Clock Cabinet Buffer 16, to determine the actual delay from the Master Clock to any logic card and finally to the output of the Card Clock Buffer by observing only test points on the Clock Cabinet Buffer itself. Depending upon the particular application, changes and modifications may be required in the system taught herein. Such changes and modifications insofar as they are not departures from the true scope of the invention, are intended to be covered by the claims which follow.

What is claimed is:

1. A time skew correction system for effecting uniformity in the delays incurred by timing signals traversing a plurality of signal paths comprising:
   a source of said timing signals having output terminal means and including means for selectively switching said timing signals ON and OFF,
   a plurality of electrical elements each having respective pluralities of input and output terminals,
   buffer means centrally disposed with respect to said source of timing signals and said plurality of electrical elements, said buffer means having input terminal means and a plurality of output terminals,
   a first transmission line coupling the output terminal means of said source of timing signals to said input terminal means of said buffer means, a plurality of second transmission lines coupling said plurality of output terminals of said buffer means respectively to said plurality of input terminals of said electrical elements,
   said output terminal means of said source of timing pulses providing in response to the switching OFF of said timing signals a terminating impedance which differs from the characteristic impedance of said first transmission line,
   capacitive means coupled to the respective plurality of electrical elements, said capacitive means providing transient discontinuities in the characteristic impedances in which said plurality of second transmission lines are normally terminated,
   generator means for selectively applying square wave pulses to said input terminal means of said buffer means and in common to all of said plurality of output terminals of the buffer means, the resultant reflected pulses appearing respectively on the last mentioned input terminal means and the plurality of output terminals providing a measure of the delays in said first transmission line and in each of said plurality of second transmission lines and its associated electrical element,
   delay line means included in said buffer means and disposed in said plurality of signal paths for adjusting the signal delay from said output means of said source of timing signals to the plurality of output terminals of said electrical elements to the same predetermined worst case maximum amount.

2. A time skew correction system as defined in claim 1 wherein said first transmission line is a twisted pair shielded line.

3. A time skew correction system as defined in claim 2 wherein said plurality of second transmission lines are respectively coaxial lines.

4. A time skew correction system as defined in claim 3 characterized in that said output terminal means of said source of timing signals is a differential driver having an input terminal and a pair of output terminals coupled respectively to the twisted pair conductors at one extremity of said first transmission line.

5. A time skew correction system as defined in claim 4 characterized in that said input terminal means of said buffer means is a differential receiver having an output terminal and a pair of input terminals, the latter being coupled respectively to the twisted pair conductors at the opposite extremity of said first transmission line.

6. A time skew correction system as defined in claim 5 further including resistance means connected between said pair of input terminals of said differential receiver, said resistance means terminating said twisted pair shielded line in its characteristic impedance.

7. A time skew correction system as defined in claim 6 further characterized in that said electrical elements comprise respectively card clock buffers.

8. A time skew correction system as defined in claim 7 further including resistance means connected between the input terminal of said card clock buffer and a source of reference potential said last mentioned resistance means terminating said coaxial line in its characteristic impedance.

9. A time skew correction system as defined in claim 8 further characterized in that said delay line means includes a first adjustable delay line having an input terminal and an output terminal, and a plurality of second adjustable delay lines each having an input terminal and an output terminal, the input terminal of said first delay line being coupled to the output terminal of said differential receiver, the output terminal of said first delay line being coupled in common to all of the respective input terminals of said second adjustable delay lines, the respective output terminals of said last mentioned delay lines being coupled to said plurality of output terminals of said buffer means.

10. A time skew correction system as defined in claim 9 further characterized in that said capacitive means includes a first and a second capacitor, said first capacitor being connected in parallel across said resistance means at said input terminal of said card clock buffer and causing a pulse to be reflected back to an output terminal of said buffer means which is a measure of the delay through the coaxial line connected to the last mentioned terminal, said second capacitor having a pair of terminals connected respectively to the input and output terminals of said card clock buffer, said second capacitor generating a reflected pulse displaced in time from the reflected pulse provided by said first capacitor and providing a measure of the delay through said card clock buffer.

11. A time skew correction system as defined in claim 10 further characterized in that said generator means selectively provides dual-frequency square wave pulses on a respective pair of its output terminals, a first gate and a capacitor connected in series relationship and coupling one of said last mentioned pair of output terminals to a predetermined one of said pair of input terminals of said differential receiver, a second gate coupling the other of said last mentioned pair of output terminals to said input terminal of said first delay line.

12. A time skew correction system as defined in claim 11 further including a plurality of clocked elements coupled respectively to the output terminals of said card block buffers, said clocked elements being dependent upon the synchronous receipt of said timing pulses for satisfactory operation.

13. A time skew correction system as defined in claim 12 wherein the ratio of the physical lengths of said first and second transmission lines is of the order of 10 to 1, the lower and higher of the dual-frequency square wave pulses provided by said generator means being coupled respectively to said first and second transmission lines.

14. A time skew correction system as defined in claim 13 further characterized in that said source of gating signals includes an oscillator having an output terminal, and gating means interposed between said last mentioned output terminal and said input terminal of said differential driver, said gating means being selectively enabled and disabled by a switch coupled thereto and effecting the turn ON and OFF of said timing signals.

* * * * *